(12) United States Patent
Huang et al.

(10) Patent No.: US 7,713,912 B2
(45) Date of Patent: May 11, 2010

(54) NANO PHOTOCATALYTIC SOL AND APPLICATION THEREOF

(75) Inventors: Chia-Hung Huang, Taipei (TW); Yao-Ling Huang, Hsinchu (TW); Yao-Hsuan Tseng, Taoyuan (TW); Yu-Ming Lin, Hsinchu (TW); Shu-Ling Liu, Miaoli (TW)

(73) Assignee: Industrial Technology Research Institute, Hsinchu (TW)

( * ) Notice: Subject to any disclaimer, the term of this patent is extended or adjusted under 35 U.S.C. 154(b) by 419 days.

(21) Appl. No.: 11/512,220

(22) Filed: Aug. 30, 2006

(65) Prior Publication Data

US 2007/0149393 A1     Jun. 28, 2007

(30) Foreign Application Priority Data

Dec. 23, 2005    (TW)    .............................. 94146089 A

(51) Int. Cl.
*B01J 23/00* (2006.01)
*B01J 23/06* (2006.01)
*C01G 23/047* (2006.01)
*C01G 9/02* (2006.01)
*C01G 19/02* (2006.01)
*C09D 1/00* (2006.01)

(52) U.S. Cl. ........................ 502/350; 502/343; 502/352; 423/610; 423/618; 423/622; 106/18.36; 106/286.4; 106/286.6

(58) Field of Classification Search ................. 502/343, 502/350, 352; 423/610, 618, 622; 106/18.36, 106/286.4, 286.6
See application file for complete search history.

(56) References Cited

U.S. PATENT DOCUMENTS 3,959,399 A  *   5/1976  Bridwell et al. .............. 585/458
6,653,356 B2 *  11/2003  Sherman ...................... 516/90

* cited by examiner

*Primary Examiner*—Jerry Lorengo
*Assistant Examiner*—Kevin M Johnson
(74) *Attorney, Agent, or Firm*—Bacon & Thomas, PLLC

(57) ABSTRACT

The present invention relates to a nano-sized photocatalytic sol and application thereof. The invention utilizes spherical nano-photocatalyst and non-spherical photocatalytic sol for coating a photocatalyst layer on a substrate. Because of the stereo, interlaced and composite structure between spherical photocatalyst and non-spherical photocatalyst, a hard and well adhesion coated layer of photocatalyst with good photocatalytic activity can be obtained without using binder.

20 Claims, No Drawings

NANO PHOTOCATALYTIC SOL AND APPLICATION THEREOF

BACKGROUND OF THE INVENTION

1. Field of the Invention

The present invention relates to a nano-photocatalytic sol composed of spherical nano-photocatalyst and non-spherical nano-photocatalyst. A photocatalytic layer with high adhesion and good activity could be made with this nano-photocatalytic sol.

2. Description of the Related Art

Nanotechnology is the technology for producing material in the size of $10^{-9}$ meter (1 nanometer is equal to $10^{-9}$ meter), measuring its properties, and applying the special properties of such nano-sized material to the making of devices. Nanomaterials come in a wide variety and cover the fields of semiconductor, metal, polymer, biomedicine, carbon tube, etc. Nanomaterials are typically applied with their electrical, optical, magnetic, and chemical properties. The novel characteristics of nanomaterials are also applicable to industrial catalyst to enhance the surface area of the catalyst. The doping of nanomaterial can also be used to enhance the mechanical strength of devices. Turning semiconductor materials into nanosize can create high quantum confinement of electron and hole to increase the illumination efficiency and breakdown temperature of semiconductor laser. The availability of nanosized semiconductor can further reduce the size of optical and electrical components. Nanotechnology will make the integration of electronic, optical, magnetic and bio components possible.

Nano-photocatalyst have been used extensively to improve our living environment and gradually accepted by the public. Nano-photocatalyst generally means particle size under 30 nm. Under ultraviolet light irradiation (wavelength under 380 nm), active species are produced on the surface of nanoparticle which can oxidize or reduce the pollutants. In addition, the nano-photocatalyst coating layer is highly photo-induced hydrophilic, it can be applied to anti-fog, anti-dust and other self-cleaning functions. Nano-photocatalyst has been used extensively for pollutant removal, air cleansing, water purification, odor removal, anti-bacteria, anti-dust and anti-fog purposes.

Despite of their activities of anti-bacteria and pollutant removal effects, nano-photocatalysts in the form of particles cannot be used directly. The nanoparticles must be immobilized on the surface of certain substrates, e.g. ceramic, glass, wall, metal or some plastic materials. And the surface of substrate will not be oxidized or decomposed by the nano-photocatalyst. The adhesion between the nano-photocatalytic particles and substrate after immobilization is the primary factor determining the service life of photocatalyst. For convenience sake, the immobilization process is carried out with the nano-photocatalyst prepared into aqueous sol. Currently the production of nano-photocatalytic sol is produced from metal salt as starting material. In the example of common titania photocatalyst, the titanium alkanoxide salt and titanium inorganic salt are used as precursors to synthesize titania photocatalytic sol with particle size under 100 nm. Other approaches to prepare nano-photocatalytic sol including mixing nano-photocatalytic powder directly with water. However such approach needs to address further the problem of dispersion to render the nanoparticles more durable and functional in subsequent adhesion process. That is, if the nano-photocatalyst adheres strongly to the substrate, it will continue to function and becomes a product with long-standing actions on dirt removal, odor removal, anti-bacteria, anti-fog and self-cleansing.

In the development of titania nano-photocatalyst technology, ROC Patent No. 349981 discloses a method for producing non-crystalline titanium peroxide sol, in which $TiCl_4$ is used as starting material, which is added with hydrogen peroxide under low-temperature (<15° C.) after titration with ammonia water to pH 2~6 and then cultivated under atmospheric temperature for 7~10 days to obtain non-crystalline titanium peroxide sol. This titanium peroxide sol addresses the coating problem. But it must be subjected further to high-temperature calcinations (250~940° C.) to become ready as nano-photocatalytic coating, and the substrate surface must undergo hydrophilic pretreatment with surfactant to enhance the adhesion of nano-photocatalytic sol. ROC Patent No. 460321 proposes an amorphous titanium peroxide sol, which becomes crystalline titanium dioxide sol mixture after thermal treatment of 100° C. before coating the substrate, or the titanium dioxide powder is mixed with photocatalytic sol before coating the substrate. Another ROC Patent No. 491883 proposes the use of amorphous titanium peroxide sol as coating agent and ceramic containing dielectric or electric conductor as intermediate layer for coating the substrate. In ROC Patent No. 448219, surfactant and solvent or silicon dioxide are used as undercoating for coating onto substrate surface. ROC Patent No. 279175 proposes the mixture of non-degradable binder (fluoropolymer) and titania particles to form photocatalyst coating composition.

In view of prior art, some add organic additive directly into the photocatalytic sol to improve the adhesion of nano-photocatalyst to the substrate. But there exist the problems of non-uniform mixture and chemical/physical incompatibility between the additive and nano-photocatalyst particles, which will affect the stability and functionality of nano-photocatalytic sol. Some coat a layer of adhesive agent to the substrate surface before the coating of nano-photocatalyst sol to increase its adhesion to the substrate. But such approach involves more steps and limits the use of substrate material. In fact, currently available nano-photocatalytic sols tend to run into the adhesion problem where its coating layer on the substrate is prone to peel off, thereby adversely affecting the service life of photocatalyst.

SUMMARY OF THE INVENTION

To address the drawbacks of prior arts, the object of the present invention is to provide a photocatalytic sol that forms a harder, highly adhesive coating layer with excellent photocatalytic effect. The photocatalyst coating layer is not easy to peel off, hence prolonging the service life of photocatalyst. Another object of the present invention is to provide a photocatalytic sol without binder, so that the photocatalytic activity will not be curtailed by the use of binder.

To achieve the aforesaid objects, the nano-photocatalytic sol of the invention comprises: at least a substantially spherical nano-photocatalyst; and a non-spherical nano-photocatalytic sol; wherein the non-spherical nano-photocatalytic sol contains a non-spherical nano-photocatalyst and a partially non-crystalline photocatalyst material.

An embodiment of the nano-photocatalytic sol is prepared by mixing at least a substantially spherical nano-photocatalyst and a non-spherical nano-photocatalytic sol, wherein the latter contains a non-spherical nano-photocatalyst and a partially non-crystalline photocatalytic material.

The spherical nano-photocatalyst is in the form of powder or sol, preferably in the form of sol.

Furthermore, the nano-photocatalytic sol of the invention could be used for coating on the surface of an object. Thus the present invention also provides a nano-photocatalytic coating sol, comprising: at least a substantially spherical nano-photocatalyst; and a non-spherical nano-photocatalytic sol; wherein the non-spherical nano-photocatalytic sol containing a non-spherical nano-photocatalyst and a partially non-crystalline photocatalyst material.

When the nano-photocatalytic coating sol is applied to the surface of a substrate, it forms a substrate with a nano-photocatalytic film, wherein the nano-photocatalytic film contains at least a substantially spherical nano-photocatalyst, a non-spherical nano-photocatalyst, and a partially non-crystalline photocatalytic material.

The nano-photocatalytic sol of the invention comprises: at least a substantially spherical nano-photocatalyst; a non-spherical nano-photocatalyst; and a partially non-crystalline photocatalyst material. The present invention utilizes the structural crisscross-linking and stacking of spherical nano-photocatalyst and non-spherical nano-photocatalyst in the presence of partially crystalline photocatalytic material to form a high hardness coating with good photocatalytic activity on the substrate without the use of binder.

DETAILED DESCRIPTION OF THE INVENTION

The nano-photocatalytic sol of the invention comprises: at least a substantially spherical nano-photocatalyst; and a non-spherical nano-photocatalytic sol; wherein the non-spherical nano-photocatalytic sol contains a non-spherical nano-photocatalyst and a partially non-crystalline photocatalyst material.

The term "substantially spherical nano-photocatalyst" means microscopically the nano-photocatalyst has an appearance akin to a sphere with the ratio of its long-short axis under 1.5 and the surface of the particle may have irregular defects (e.g. protrusion or dent). Actual examples of substantially spherical nano-photocatalyst are STS-01 and STS-21 manufactured by Ishihara Sangyo Kaisha, Ltd. of Japan and Hombikat XXS-100 manufactured by Sachtleben Chemie of Germany.

The term "non-spherical nano-photocatalyst" means microscopically the nano-photocatalyst has a non-spherical appearance with the ratio of its long-short axis above 1.5, preferably above 2. For example, in the titania nano-photocatalyst disclosed in ROC Patent No. I230690, the long axis of its particles ranges from 10 to 60 nm and the short axis ranges from 5 to 20 nm.

The mass ratio of the substantially spherical nano-photocatalyst to non-spherical nano-photocatalyst in the nano-photocatalytic sol of the invention is preferably in the range of 1:3 to 3:1.

The term "nano-photocatalyst" means a nano-sized material that can catalyze/decompose compounds under the irradiation of ultraviolet light and/or visible light. The spherical nano-photocatalytic material includes nano material known to have photocatalytic activity, such as titanium dioxide, cadmium selenide, zinc oxide, and tin dioxide.

The nano-photocatalytic sol of the invention is prepared by mixing at least a substantially spherical nano-photocatalyst, non-spherical nano-photocatalyst and partially non-crystalline photocatalytic material. The partially non-crystalline photocatalytic material includes titanium oxide, cadmium selenide, zinc oxide, tin dioxide, or mixtures thereof. In one embodiment, the nano-photocatalytic sol of the invention is made by mixing at least a substantially spherical nano-photocatalyst and non-spherical nano-photocatalytic sol, wherein the non-spherical photocatalytic sol contains non-spherical nano-photocatalyst and partially non-crystalline photocatalytic material.

When preparing non-spherical nano-photocatalytic sol of metal oxide by hydrolysis and heating (i.e. the known sol-gel method for preparing metal oxide), the appearance of the resulting metal oxide tends to be non-spherical (long-short axis ratio>2) when the final step of heating reflux involves a slow crystallization process. That is, the non-spherical nano-photocatalyst of the invention may be formed by slowing down the cooling rate in the process. Furthermore, insufficient time in heating reflux process can change the degree of crystallization in photocatalyst, resulting in crystalline non-spherical nano-photocatalyst and partially non-crystalline metal oxides in the sol.

The non-spherical nano-photocatalyst used in the invention includes known nano material with photocatalytic activity, including titanium dioxide, zinc oxide and tin dioxide.

In the example of titanium dioxide nano-photocatalytic sol, its preparation has been enclosed in ROC Patent No. I230690. In brief, titanium salt is used as precursor, which is precipitated by mixing with an alkaline sol (e.g. ammonia water or sodium hydroxide) to obtain the titanium hydroxide. And then, it is peptized by using the hydrogen peroxide or acidic species (e.g. nitric acid, hydrochloric acid or oxalic acid). Furthermore, the inorganic modifier is used to change the property of titanium dioxide sol. Finally, the titanium dioxide sol with non-spherical photocatalyst particle is obtained after heating the peptized sol at 40-110° C. for 2-48 hrs.

The nano-photocatalyst in the nano-photocatalytic sol of the invention may be added directly in the form of powder or prepared first in the form of sol. In a preferred embodiment, the nano-photocatalyst is first prepared into sol form to facilitate the liquid/liquid mixture, while the direct addition of powder might lead to coagulation.

The nano-photocatalytic sol of the invention may form a coating layer on the surface of substrate by known techniques, including spraying, painting, spin coating and immersion. The photocatalytic coating layer of the invention comprises: spherical nano-photocatalyst, non-spherical nano-photocatalyst and partially non-crystalline photocatalytic material described above, in which, spherical nano-photocatalyst constitutes the main structure of the coating, while non-spherical nano-photocatalyst and partially non-crystalline photocatalytic material provide the backbone and adhesive component of the coating layer. The interlaced structure of coating layer, just like concrete shows good adhesion and high hardness after heating or drying process. The surface of coating layer is more porous than the prior art, because of the interlaced structure. The porous surface of photocatalytic layer could provide the better photo-induced activities, especially no binder added.

The advantages of the present invention are further depicted in the illustration of examples, but the descriptions made in the examples should not be construed as a limitation on the actual application of the present invention.

EXAMPLE 1

The Adhesion, Hardness and Hydrophilicity of Photocatalytic Sol of the Invention First prepare titania photocatalytic sol that contains partially non-crystalline titanium dioxide according to the method disclosed in ROC Patent No. I230690 less the final heating reflux process. Subsequently mix the sol prepared thereof with commercially available spherical titanium dioxide nano-photocatalytic sol (Hombikat XXS-100 by Sachtleben Chemie; its titanium dioxide content is 15.2%) based on the content of titanium dioxide in the sol. After mixing well, spherical titanium dioxide nano-photocatalyst accounts for 40%, 50%, and 60% of the sols respectively. Next, spray the prepared sols (contrast groups) containing spherical titanium dioxide and non-spherical titanium dioxide (also containing partially non-crystalline titanium dioxide) over a ceramic tile surface to form a thin film. Heat each test specimen in 600° C. for 5 minutes. At this time, the weight of photocatalyst on each test specimen is 0.002±0.0005 g. Next measure the surface adhesion and hardness of each test specimen. The adhesion was tested with Staedtler eraser, which rub across 2-3 cm of test specimens at 45-degree angle for 30 times. Hardness was tested with a pencil hardness tester. The testing of hydrophilicity reflects the self-cleaning capability, for hydrophilic surface is less prone to the adhesion of hydrophobic grease or dirt. Generally hydrophilicity is measured by the contact angle between the specimen surface and water. The smaller the contact angle, the better the hydrophilicity of substrate surface. Conversely, big contact angle means the substrate surface is hydrophobic. The hydrophilicity was tested using First Ten Angstrom FTA-125 where 4 μL of deionized water was dropped on the specimen after 2 hours irradiation of 1 mW/cm2 intensity (315-400 nm).

The test results are shown in Table 1 below:

ucts under comparison include: 1. commercial spherical photocatalytic sol; 2. commercial spherical photocatalytic sol+ 0.1% $SiO_2$ binder 3. non-spherical photocatalytic sol; 4. photocatalytic sol of this invention. Comparison was made by spraying the four formulations described above on a ceramic tile surface, which was then heated under 600° C. for 5 minutes. The adhesion was tested with Staedtler eraser, which rub across 2-3 cm of test specimens at 45-degree angle 30 times. The hardness was tested with a pencil hardness tester.

The test specimens were tested for air purification performance. The test was conducted according to JIS R1701-1, where the flow of tested gas was 1 L/min, the weight of photocatalyst on each test specimen was 0.002±0.0005 g, and the standard gas is nitrogen monoxide (NO). Dry and moist air were fed into a flow meter to control the relative humidity at 50% and concentration at 1 ppm of NO. After the concen-

TABLE 1

| Weight of spherical photocatalyst | 40% | | 50% | | 60% | |
|---|---|---|---|---|---|---|
| Crystallinity of photocatalytic sol mixed | Crystallized >95% | Not crystallized | Crystallized >95% | Not crystallized | Crystallized >95% | Not crystallized |
| Adhesion | √ | √ | √ | √ | √ | √ |
| Hardness | 3H | 2H | 8H | 8H | 6H | 5H |
| Contact angle Before irradiation | 45.39 | 43.02 | 45.18 | 45.97 | 45.35 | 48.04 |
| After irradiation | 10.52 | 10.50 | 15.16 | 11.18 | 11.11 | 15.05 |

※ For adhesion test,
"√" means the specimen passed the test,
"X" means peel-off occurred.

As shown in Table 1, the coating of photocatalytic sol of the invention on substrate surface exhibits good adhesion, high hardness and good hydrophilicity.

COMPARATIVE EXAMPLE 1

Comparing the Adhesion, Hardness and Air Purification Performance of Photocatalytic Sol of the Invention with Commercial Formulations The adhesion and hardness of the coating layer with different formulations on substrate surface are compared. Prodtration of tested gas is stable, it was introduced into the photocatalyst reactor and observed for 30 minutes to see if the specimen showed adsorption reaction before ultraviolet light was turned on. After the test specimens were irradiated under UV light for 5 hours to test their photocatalytic activity, the standard gas was turned off and the specimens were observed for another 30 minutes to see if desorption occurred.

The test results are shown in Table 2 below:

TABLE 2

| | Photocatalyst sol | | | |
|---|---|---|---|---|
| Test result* | Commercial spherical photocatalytic sol | Spherical + 0.1% $SiO_2$ binder | Non-spherical photocatalytic sol (ROC I 230690) | Formulation prepared according to this invention |
| NOx removal (μmol/m²/h) | 6.13 | 4.4 | 3.2 | 6.06 |
| Adhesion | X | X | √ | √ |
| Hardness | 2H | 8H | 8H | 8H |

※ For adhesion test,
"√" means the specimen passed the test,
"X" means peel-off occurred.

As shown in Table 2, commercial spherical photocatalytic sol does not exhibit good adhesion that the coating tends to peel off upon rubbing although its air purification ability is the best; the specimen added with $SiO_2$ binder shows better adhesion, but it still peeled off after 30 times of rubbing by an eraser. The photocatalytic sol of this invention shows adhesion and hardness similar to that made according to ROC Patent No. I230690, thus possessing commercial application value.

As shown in Table 2, test specimen prepared using the photocatalytic sol of the invention is second only to commercial photocatalytic coating in terms of NOx removal, but its adhesion is far superior to that of commercial formulations as shown in adhesion test described above. The air purification performance of the photocatalytic sol of this invention is far better than product added with binder because it is free of binder and offers bigger reaction area. The photocatalytic sol of this invention further enhances the photocatalytic effect of patented product disclosed in ROC Patent No. I230690.

To sum up, the nano-photocatalytic sol of the invention may be used to form photocatalytic coating layer on substrate surface. Due to the interlaced structure of spherical nano-photocatalyst, non-spherical nano-photocatalyst and partially non-crystalline photocatalytic material, the coating formed layer thereof possesses high adhesion, high hardness, and excellent photocatalytic activity.

Other Embodiments

All features of the invention disclosed herein can be combined with other methods and each feature may be selectively replaced by a feature with identical, equivalent or similar object. Thus except for particularly prominent features, all features disclosed in the description are only an example of equivalent or similar feature.

The preferred embodiments of the present invention have been disclosed in the examples. However the examples should not be construed as a limitation on the actual applicable scope of the invention, and as such, all modifications and alterations without departing from the spirits of the invention and appended claims shall remain within the protected scope and claims of the invention.

What is claimed is:

1. A nano-photocatalytic sol, comprising:
   at least a substantially spherical nano-photocatalyst; and
   a non-spherical nano-photocatalytic sol comprising a i) non-spherical nano-photocatalyst and ii) partially non-crystalline photocatalytic material,
   wherein said substantially spherical nano-photocatalyst and said non-spherical nano-photocatalyst are in a mass ratio of 1:3 to 3:1;
   wherein said substantially spherical nano-photocatalyst has an appearance of having long-short axis ratio under 1.5, and
   wherein said non-spherical nano-photocatalyst has an appearance of having a long-short axis of above 1.5.

2. The nano-photocatalytic sol according to claim 1, wherein the spherical nano-photocatalyst is titanium dioxide, cadmium selenide, zinc oxide or tin dioxide.

3. The nano-photocatalytic sol according to claim 1, wherein the non-spherical nano-photocatalyst is titanium dioxide, zinc oxide or tin dioxide.

4. The nano-photocatalytic sol according to claim 1, wherein the partially non-crystalline photocatalytic material is titanium dioxide, cadmium selenide, zinc oxide or tin dioxide.

5. The nano-photocatalytic sol according to claim 1, wherein the nano-photocatalytic sol is free of a binder and can form a stereo, interlaced and composite structure between spherical photocatalyst and non-spherical photocatalyst to provide coated layer of photocatalyst on a substrate.

6. A nano-photocatalytic coating sol, comprising:
   at least a substantially spherical nano-photocatalyst;
   a non-spherical nano-photocatalyst; and
   a partially non-crystalline photocatalytic material, and
   wherein the nano-photocatalytic sol is free of a binder and can form a stereo, interlaced and composite structure between spherical photocatalyst and non-spherical photocatalyst to provide a coated layer of photocatalyst on a substrate,
   wherein said substantially spherical nano-photocatalyst and said non-spherical nano-photocatalyst are in a mass ratio of 1:3 to 3:1;
   wherein said substantially spherical nano-photocatalyst has an appearance of having long-short axis ratio under 1.5, and
   wherein said non-spherical nano-photocatalyst has an appearance of having a long-short axis of above 1.5.

7. The nano-photocatalytic coating sol according to claim 6, wherein the spherical nano-photocatalyst is titanium dioxide, cadmium selenide, zinc oxide or tin dioxide.

8. The nano-photocatalytic coating sol according to claim 6, wherein the non-spherical nano-photocatalyst is titanium dioxide, zinc oxide or tin dioxide.

9. The nano-photocatalytic coating sol according to claim 6, wherein the partially non-crystalline photocatalytic material is titanium dioxide, cadmium selenide, zinc oxide or tin dioxide.

10. A nano-photocatalytic sol, comprising:
    at least a substantially spherical nano-photocatalyst;
    a non-spherical nano-photocatalyst; and
    a partially non-crystalline photocatalytic material, and
    wherein the nano-photocatalytic sol is free of a binder and can form a stereo, interlaced and composite structure between spherical photocatalyst and non-spherical photocatalyst to provide a coated layer of photocatalyst,
    wherein said substantially spherical nano-photocatalyst and said non-spherical nano-photocatalyst are in a mass ratio of 1:3 to 3:1;
    wherein said substantially spherical nano-photocatalyst has an appearance of having a long-short axis ratio under 1.5, and
    wherein said non-spherical nano-photocatalyst has an appearance of having a long-short axis of above 1.5.

11. A method for producing the nano-photocatalytic sol according to claim 10, comprising mixing said substantially spherical nano-photocatalyst and a non-spherical nano-photocatalytic sol, and wherein the non-spherical nano-photocatalytic sol comprises:
    a non-spherical nano-photocatalyst; and
    a partially non-crystalline photocatalytic material.

12. The method according to claim 11, wherein the spherical nano-photocatalyst is in the form of powder or sol.

13. The method according to claim 11, wherein the spherical nano-photocatalyst is in the form of sol.

14. The method according to claim 11, wherein the spherical nano-photocatalyst is titanium dioxide, cadmium selenide, zinc oxide or tin dioxide.

15. The method according to claim 11, wherein the non-spherical nano-photocatalyst is titanium dioxide, zinc oxide or tin dioxide.

16. The method according to claim 11, wherein the partially non-crystalline photocatalytic material is titanium dioxide, cadmium selenide, zinc oxide or tin dioxide.

17. A substrate with a nano-photocatalytic film on its surface, wherein the nano-photocatalytic film comprises at least a spherical nano-photocatalyst, a non-spherical nano-photocatalyst and a partially non-crystalline photocatalytic material, and wherein the film is free of a binder and can form a stereo, interlaced and composite structure between spherical photocatalyst and non-spherical photocatalyst to provide a coated layer of photocatalyst on a substrate, wherein said substantially spherical nano-photocatalyst and said non-spherical nano-photocatalyst are in a mass ratio of 1:3 to 3:1;

wherein said substantially spherical nano-photocatalyst has an appearance of having long-short axis ratio under 1.5, and wherein said non-spherical nano-photocatalyst has an appearance of having a long-short axis ratio of above 1.5.

18. The substrate according to claim 17, wherein the spherical nano-photocatalyst is titanium dioxide, cadmium selenide, zinc oxide or tin dioxide.

19. The substrate according to claim 17, wherein the non-spherical nano-photocatalyst is titanium dioxide, zinc oxide or tin dioxide.

20. The substrate according to claim 17, wherein the partially non-crystalline photocatalytic material is titanium dioxide, cadmium selenide, zinc oxide or tin dioxide.

* * * * *